United States Patent Office 3,264,684
Patented August 9, 1966

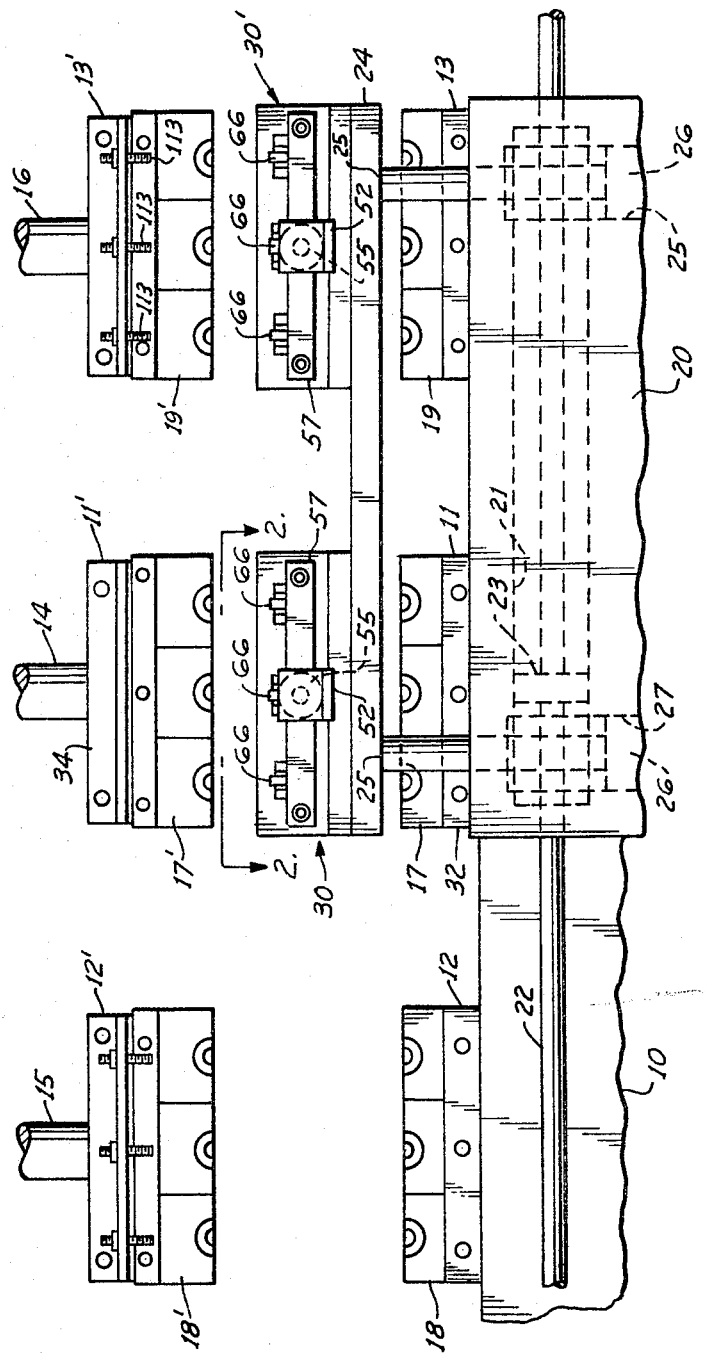

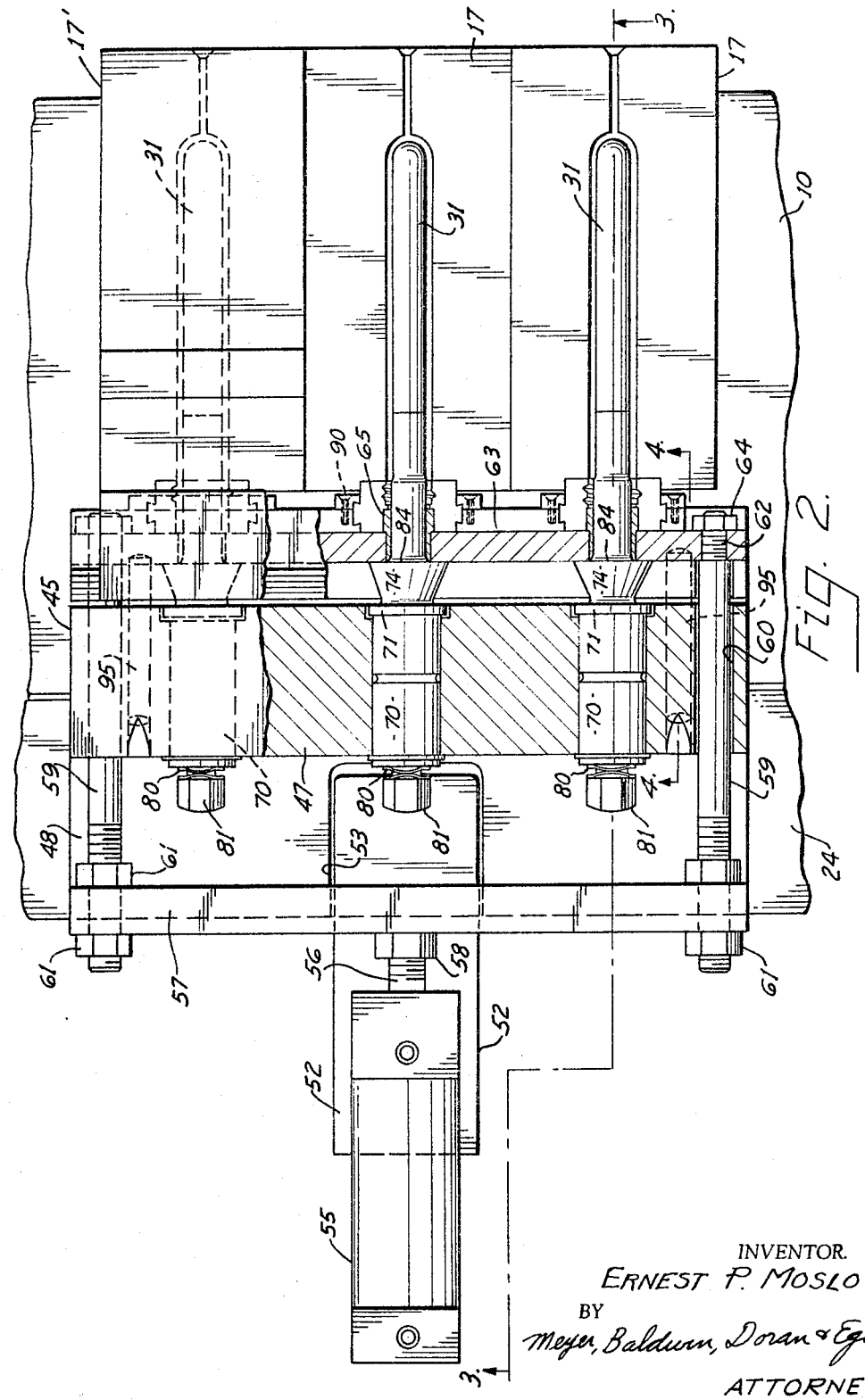

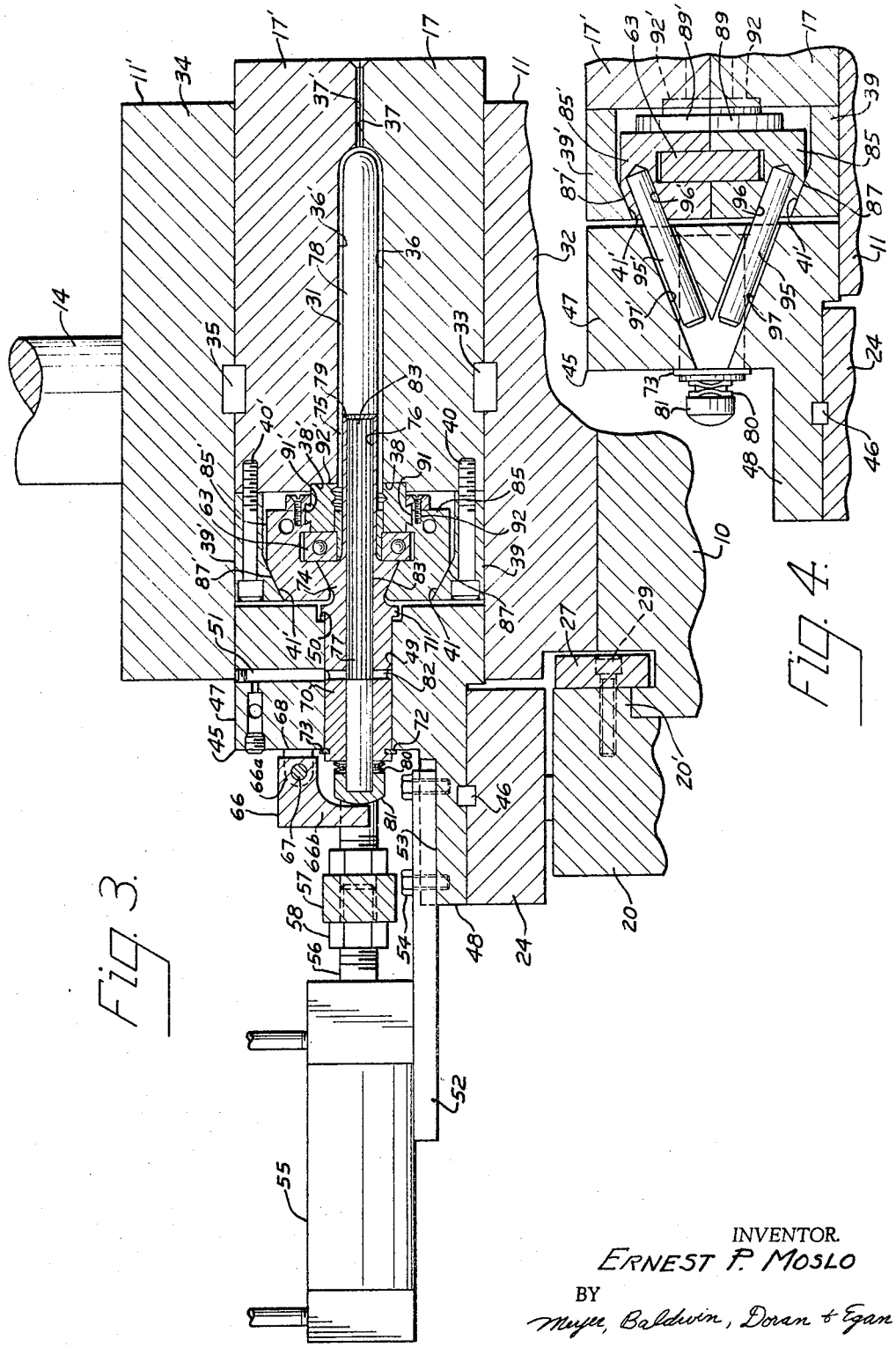

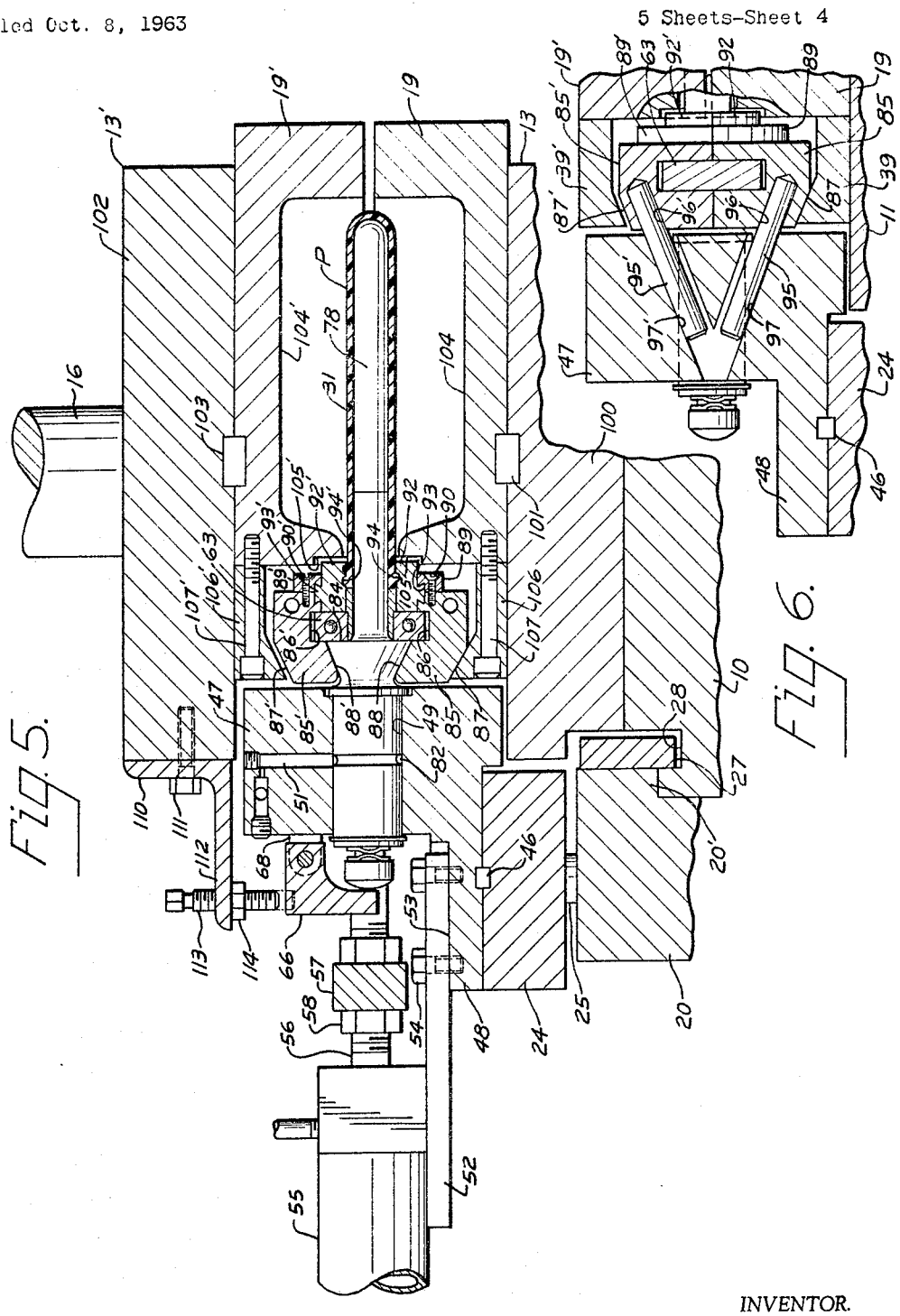

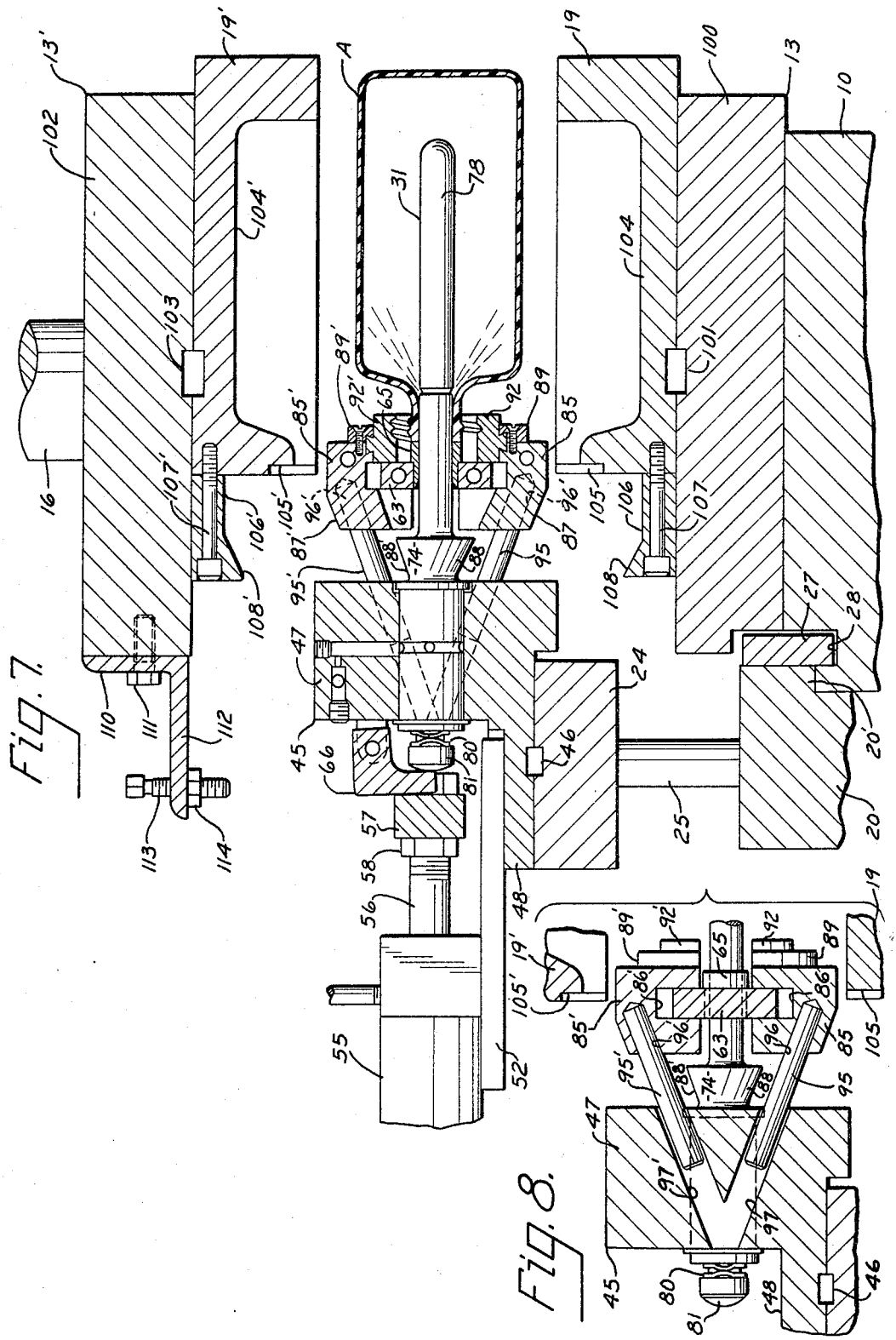

3,264,684
NECK RING MOLD
Ernest P. Moslo, 2443 Prospect Ave.,
Cleveland 5, Ohio
Filed Oct. 8, 1963, Ser. No. 314,728
10 Claims. (Cl. 18—5)

This invention relates generally to the art of forming finished articles from thermoplastic material by the method commonly referred to as blow molding and more particularly to apparatus for use with a blow molding machine for forming the neck portions of hollow plastic articles.

A typical blow molding machine comprises a parison mold and one or more blow molds and means for transferring a core rod from the parison mold, where a parison of plasticized material is injection molded thereon, to a blow mold, where the parison is expanded by pressurized fluid such as air into a finished, hollow article. Hollow articles such as bottles or other containers commonly must be provided with threaded or otherwise especially formed necks which more practically are formed at the parison mold during injection and are not directly involved in the blow forming process. A problem arises in transferring these preformed necks from the parison mold to the blow mold without disturbing or damaging preformed threads or other formations at the neck of the article. One typical solution to this problem is to provide a separate neck mold which is transferable in a closed condition from the parison mold to the blow mold thereby leaving the preformed neck undisturbed. The neck mold must be separable but must separate only at the blow mold after the finished article has been blown.

It is a general object of this invention to provide a neck mold in the form of a partable ring having means for transferring said mold from the parison mold to the blow mold in closed position and means subsequently opening it at the blow mold after the finished article has been blown.

A more specific object of the invention is to provide a neck ring mold which is longitudinally movable with respect to the core rod and is provided with means for opening said mold when it is moved in one direction and closing said mold when it is moved in the opposite direction.

Another object is to provide a partable neck ring mold wherein the halves of said mold are provided with relatively converging pins which are slidable within a relatively stationary member whereby movement of said mold outwardly of said member causes said halves to separate and movement thereof toward said member causes said halves to close.

Still another object of this invention is to provide a portable neck ring mold cooperant with a mechanical stripper for stripping finished articles from a core rod wherein movement of said stripper longitudinally along the core rod causes the halves of said mold to open.

Further objects of the invention and many advantages thereof will be readily apparent from the following description of one embodiment of the invention as illustrated in the accompanying drawings.

In the drawings:

FIG. 1 is a simplified front elevation of a blow molding machine showing the main parts thereof;

FIG. 2 is generally a top plan view as seen from the line 2—2 of FIG. 1 with some parts shown in section;

FIG. 3 is a section taken generally along the line 3—3 of FIG. 2, modified to show a parison mold and a neck ring mold assembly closed upon a core rod;

FIG. 4 is a section taken along the line 4—4 of FIG. 2 with the parison mold closed as in FIG. 3;

FIG. 5 is a view similar to FIG. 3 modified to show the core rod at a blow mold just prior to the closing of said blow mold;

FIG. 6 is a view similar to FIG. 4 showing the positions of the parts thereof when the blow mold is in the position of FIG. 5;

FIG. 7 is a view similar to FIG. 5 showing the blow mold and a neck ring mold in open position; and FIG. 8 is a view similar to FIG. 6 showing the positions of the parts thereof when the blow mold is in the open position of FIG. 7.

FIG. 1 of the drawings shows in simplified form a front view of a blow molding machine of the general type disclosed in detail in my copending application Serial No. 78,100, filed December 23, 1960, now Patent No. 3,116,- 516 and entitled Bottle Blowing Machine. Generally, the machine comprises a fixed frame 10 having mounted thereon in laterally spaced relationship a centrally disposed lower parison mold half 11 and a pair of flanking lower blow mold halves 12 and 13. Corresponding upper mold halves 11', 12', and 13' are shown in open position above the lower mold halves 11, 12 and 13 respectively. The upper mold halves 11', 12', and 13' are carried by suitable clamping or closing means indicated at 14, 15, and 16 respectively whereby they are movable between the open position as illustrated and a closed position upon the lower mold halves 11, 12 and 13. The lower parison mold half 11 carries a plurality of mold inserts 17 and the upper parison mold half 11' carries a plurality of complementary mold inserts 17'. When the parison mold closes, the inserts 17 and 17' provide a plurality of cavities for injection molding parisons upon a corresponding plurality of core rods. In a similar manner, the blow mold halves 12–12' and 13–13' carry inserts 18–18' and 19–19' respectively which provide mold cavities in which finished articles are formed when the blow molds are closed upon the core rods.

In front of the frame 10, there is provided a laterally movable table 20 which has an axially horizontal cylindrical bore 21 therein and a horizontally disposed, fixed piston rod 22 disposed through said bore. The piston rod 22 is mounted rigidly with the fixed frame 10 and carries a piston 23 which is disposed within the cylindrical bore 21. It will be readily understood that by introducing pressure fluid into the cylindrical bore 21 on either side of the piston 23, the table 20 can be caused to reciprocate laterally of the fixed frame 10.

The table 20 carries a vertically movable platform 24 supported at the upper end of a pair of piston rods 25. The piston rods 25 project slidably downwardly into suitable apertures in the table 20, and the lower ends of said piston rods carry pistons 26 which are disposed within axially vertical cylindrical bores 27 of said table. By means of pressure fluid introduced into the cylindrical bores 27 above or below the pistons 26, the platform 24 can be caused to move vertically downwardly or upwardly. FIG. 1 shows the platform 24 in its raised position, and in its lowered position said platform is disposed just above the upper surface of the table 20.

The platform 24 carries, adjacent to the lateral ends thereof, core rod assemblies generally indicated at 30 and 30' in FIG. 1. These core rod assemblies are identical in construction and function, and only the assembly 30 will be described in detail. As shown in FIG. 2, the core rod assembly 30 carries a plurality of core rods 31 which are laterally spaced from each other such distance as to be alignable with the plurality of coacting inserts 17—17', 18—18', or 19—19'.

In general operation, the upper parison and blow mold halves alternately open and close upon the corresponding lower blow mold halves with the table 24 being shifted laterally during each open position. Assuming an initial position of the parts as illustrated in FIG. 1, a typical cycle of movement would be as follows: the table 24 lowers to dispose the core rods 31 in the inserts 17 and 19 of the mold halves 11 and 13; all of the upper mold halves close with the inserts 17' and 19' closing upon the core rods; parisons are injection molded upon the core rods at the parison mold concurrently with the blowing of finished articles at the right-hand blow mold; the molds open and the table 24 moves upwardly to the raised position illustrated; the table 20 moves laterally whereby the core rod assembly 30 is disposed between the mold halves 18 and 18' and the core rod assembly 30' is disposed between the mold halves 17 and 17'; the table 24 again lowers; the molds close; and the parisons at the assembly 30 are blown into finished articles at the left-hand blow mold while new parisons are molded upon the core rods of the assembly 30' at the parison mold. Thus it will be seen that upon each closing of the molds, parisons are formed upon the core rods associated with one of the core rod assemblies while, concurrently, previously formed parisons are being blown into finished articles at the other core rod assembly. Upon each opening of the molds, the core rod assemblies are shifted laterally whereby the one which was positioned at the parison mold is shifted to one of the flanking blow molds.

Each time a blow mold opens after finished articles are blown therein, said finished articles are mechanically stripped from the core rods. The stripping mechanism will be described in connection with the neck ring mold of this invention because there is intimate coaction between the stripping motion and the operation of said neck ring mold.

Referring now to FIGS. 2 and 3, and particularly to FIG. 3, the table 20 has a rearwardly offset portion 20' that carries a downwardly projecting retainer and guide plate 27 which slidably interfits a laterally directed channel or way 28 in the fixed frame 10. The guide plate is secured to the table in any suitable manner such as by cap screws 29 and prevents forward and rearward movement of the table 20 but allows the above described lateral shifting movement of said table. A lower parison mold base 32 is mounted upon the frame 10 at the parison mold which said base carries the inserts 17 keyed thereto by a key 33. The upper parison mold half 11' has an upper parison mold base 34 to which the inserts 17' are secured, said inserts being keyed to the base 34 by a key 35. The inserts 17 and 17' have complementary cavities 36 and 36' respectively which are adapted to embrace the core rods 31 when the parison mold is closed to define molding spaces around the core rods for forming parisons P thereon (FIG. 5). Said inserts 17 and 17' also have complementary grooves 37 and 37', at their parting surfaces whereby plasticized material can be injected into the parison forms defined by the cavities 36 and 36'. The forwardly directed ends of the inserts 17 and 17' have rearwardly directed, complementary semicircular recesses 38 and 38' adapted to embrace a portion of a neck ring mold in a manner to be hereinafter fully described. Said inserts 17 and 17' also carry complementary cams 39 and 39' which are bolted to the inserts by cap screws 40 and 40' and project forwardly therefrom. The cams 39 and 39' afford forwardly converging cam surfaces 41 and 41' which are adapted to embrace an entire neck ring mold assembly in a manner to be also hereinafter fully described.

The core rods 31 are carried by a base member 45 which in turn is fixedly carried by the platform 24 and is keyed thereto by a key 46. The base member 45 comprises a relatively thick, upstanding body portion 47, a part of which projects forwardly between the mold bases 32 and 34, and a rearwardly projecting mounting portion 48 which is connected directly to the platform 24. The body portion 47 is provided with a plurality of axially parallel, horizontally directed apertures 49 which are outwardly stepped to form recessed shoulders 50 adjacent to the rearwardly directed face of said body portion. Said body portion also has air passage means 51 therein by means of which pressure fluid such as air is directed to the core rods 31.

A mounting plate 52 is secured at one end thereof by bolts 54 to the mounting portion 48 within a rectangular recess 53 of said mounting portion. As shown in FIG. 2, the mounting plate 52 is disposed in the middle of the mounting portion 48, and a large portion thereof is cantilevered forwardly from the base member 45 and the platform 24. The distal end portion of said mounting plate carries a cylinder and piston motor 55 having a forwardly projecting piston rod 56. The piston rod 56 is thread fitted into the crossbar 57 which extends the full lateral width of the base member 45 and is secured by a lock nut 58. The laterally directed ends of the crossbar 57 carry forwardly projecting guide rods 59 which slidably interfit bores 60 adjacent to the laterally directed ends of the base member 45. The forwardly directed ends of the guide rods 59 project through suitable apertures in the crossbar 57 and are secured to said crossbar by lock nuts 61, and the rearwardly directed ends of said guide rods project rearwardly of the body portion 47 of the base member 45.

The rearwardly directed ends of the guide rods 59 have reduced threaded portions 62 adapted to receive the ends of a stripper ring bar 63 secured thereto by nuts 64. The stripper bar 63 is disposed parallel with the crossbar 57 and carries a plurality of stripper rings 65 which slidably engage a portion of each core rod 31.

The base member 45 also carries an L-shaped actuator 66 having one leg portion 66a thereof pivoted upon a pin 67 carried by a bracket 68 projecting forwardly from the front face of the body portion 47. The other leg of the L-shaped actuator shown at 66b projects downwardly in front of each core rod 31.

Each core rod 31 comprises a mounting end portion 70, which closely interfits one of the apertures 49, and a circumferential flange 71, which is adapted to seat against the associated shoulder 50 of said aperture. The mounting portion 70 projects forwardly beyond the front face of the mounting portion 47 and is there provided with a circumferential groove 72 having a retainer ring 73 disposed therein. In the position of the mounting end portion 70 of FIG. 3, it will be noted that the retainer ring 73 is disposed against the front face of the body portion 47 and that the flange 71 is moved slightly rearwardly from the shoulder 50. This clearance allows a very slight forward and rearward movement of each core rod.

Forwardly of the flange 71, the core rod 31 has a rearwardly diverging, conical portion 74 and forwardly of that a reduced, sleeve portion 75 which projects a substantial distance into the mold formed by the sections 17 and 17'. A central bore 76 extends continuously through the mounting end portion 70, the conical portion 74, and the sleeve portion 75 and has slidably mounted therein a stem 77 of an elongated valve head 78. The distal end of the sleeve portion 75 affords a valve seat 79 against which the valve head 78 normally seats. The head 78 is biased toward the seat by spring washers 80 which bear against a cap 81 mounted upon a forwardly directed end portion of the stem 77 forwardly of the mounting end portion 70. Air passage means 82 of the mounting end portion 70 communicates with the air passage means 51 of the body portion 47 and also communicates with longitudinal grooves 83 in the surface of the stem 77 which said grooves extend from said air passage means 82 to the distal end of sleeve portion 75 at the valve seat 79. It will be readily seen that pressurized air introduced into the passage means 51 can be released around the valve seat 79 by depressing the cap 81 against the bias of the spring washers 80 thereby moving the valve head 78 in a rearward direction.

Referring now particularly to FIG. 5, each conical portion 74 affords a circumferential, rearwardly facing shoulder 84 against which the forwardly directed surface of the stripper ring bar 63 abuts when said bar is fully retracted in a forward direction. Said stripper bar is engaged at its lower and upper edges by locking bars 85 and 85' which have grooves 86 and 86' respectively for receiving said edges. The locking bars 85 and 85' have outer cam surfaces 87 and 87' respectively, which coact with the cam surfaces 41 and 41' of the cams 39 and 39', and inner, semiconical cam surfaces 88 and 88' which coact with the outer surfaces of the conical portions 74 of the associated core rods 31. Retainer ring halves 89 and 89' are fastened to the rearwardly directed faces of the locking bars 85 and 85' respectively adjacent to each core rod by any suitable means such as screws 90 and 90'. Said retainer ring halves and said locking bars together afford semicircumferential, dovetailed grooves 91 and 91' (FIG. 3) which retain lower and upper neck ring mold halves 92 and 92'.

Each neck ring mold half 92 or 92' has a semicircumferential, radiating, dovetailed flange 93 or 93' which tightly fits within a groove 91 or 91' respectively whereby the associated neck ring mold half is effectively carried by one of the locking bars 85 or 85'. The forwardly directed portion of the neck ring mold fits closely over the rearwardly directed portion of the associated stripper ring 65, and the rearwardly directed portion of each neck ring mold affords means for forming threads upon the neck of a container in the form of complementary neck-forming cavities 94 and 94'.

Referring now to FIGS. 4, 6 and 8, the locking bars 85 and 85' carry obliquely directed pins 95 and 95' respectively adjacent to their laterally directed ends. The pins 95 at each end of the locking bar 85 are directed obliquely upwardly and forwardly, and the pins 95' at either end of the locking bar 85' are directed obliquely downwardly and forwardly. Said pins 95 and 95' are seated rigidly within sockets 96 and 96' of the locking bars 85 and 85' respectively at one end of said pins, and the distal end portions of said pins are slidably disposed within similarly angled, converging apertures 97 and 97' of the body portion 47 of the base member 45. The apertures 97 and 97' are slightly oversize for the pins 95 and 95' whereby said pins fit loosely within the apertures. For purposes of illustrating the present invention, the space around the pins 95 and 95' in the apertures 97 and 97' has been exaggerated and it will be understood that the drawings are not intended to illustrate the exact dimensions of these relatively interfitting parts.

In operation, each neck ring mold assembly opens and closes in response to longitudinal movement of the stripper bar 63 along the core rods 31. When said stripper bar is moved rearwardly, it necessarily moves the locking bars 85 and 85' in the same direction because they are engaged by the edges of said stripper bar at the grooves 86 and 86'. Simultaneously, the locking bars are moved vertically away from each other because the pins 95 and 95' must move divergently in the apertures 97 and 97'. Since the neck ring mold halves 92 and 92' are carried by the locking bars 85 and 85', the neck ring molds will also open as they move rearwardly relative to the core rod 31. The rearward movement of the stripper rings 65 will at the same time mechanically loosen and strip from the core rods any articles thereon. Forward movement of the stripper bar 63 will, of course, cause the neck ring mold to close because now the pins 95 and 95' must move convergently in a forward direction thereby moving the locking bars 85 and 85' toward each other.

Referring now to FIGS. 5 and 7, the blow molds are identical and only the blow mold comprising the mold halves 13 and 13' will, therefore, be described in detail. The lower blow mold half 13 comprises a lower blow mold base 100 fixedly mounted upon the fixed frame 10 and carrying the mold inserts 19 keyed thereto by a key 101. The upper blow mold half 13' has an upper blow mold base 102 to which the inserts 19' are secured and keyed by the key 103. The inserts 19 and 19' have complementary cavities 104 and 104' which together define the outer contour of a hollow article to be formed. The forward faces of the inserts 19 and 19' have semicircular recesses 105 and 105' which are identical in form and dimension with the recesses 38 and 38' of the inserts 17 and 17' respectively of the parison mold. Said inserts 19 and 19' also carry forwardly projecting cams 106 and 106' which are bolted to said inserts respectively by cap screws 107 and 107'. The cams 106 and 106' are identical with the cams 39 and 39' at the parison mold and are provided with forwardly converging cam surfaces 108 and 108' adapted to coact with the outer cam surfaces 87 and 87' of the locking bars 85 and 85' respectively.

The upper blow mold base 102 also carries on its forwardly directed face an L-shaped bracket 110 secured thereto by any suitable means such as bolts 111. The bracket 110 has a forwardly projecting flange 112 to which are mounted a plurality of adjustment screws 113 disposed on vertical axes and carrying lock nuts 114. As shown on the right-hand side of FIG. 1, the adjustment screws 113 are of the same number as the actuators 66 and are vertically aligned therewith. In use of the machine, said adjustment screws are adjusted to extend downwardly below the flange 112 a sufficient distance to cause the lower end of each adjustment screw to contact an actuator 66, pivot it about its associated pin 67, and thereby move the valve head 78 forwardly to open the core rod valve. No adjustment screws are provided at the parison mold since the core rod valves would never be opened at that position.

Referring now particularly to FIG. 7, it will be noted that the core rod valves are also actuated by the rearward movement of the crossbar 57. When the motor 55 is actuated at a blow mold to strip finished articles from the core rods, the crossbar 57 moves rearwardly into contact with the downwardly projecting legs 66b of the actuators 66, thereby also moving the valve heads 78 forwardly and opening the valves of said core rods. The purpose of this second opening of the valves is to introduce pressurized fluid into the finished articles simultaneously with the actuation of the mechanical stripper whereby said articles will not only be mechanically loosened from their respective core rods but will also be blown rearwardly between the open mold halves clear of the molds and into a suitable receptacle (not herein illustrated).

For the purpose of describing the specific operation of the neck ring mold of this invention, it will be assumed that a particular core rod 31 is initially disposed at the parison mold with the parison mold closed as illustrated in FIG. 3. At this point, the inserts 17 and 17' would be closed upon the core rod whereby pressurized plasticized material can be injected through the aperture formed by the grooves 37 and 37' into the parison form provided by the cavities 36 and 36'. The cylinder and piston motor 55 is actuated to bias the crossbar 57 and the stripper bar 63 in a forward direction whereby the neck ring mold will remain closed even after the parison mold has opened. The coacting cam surfaces 41–87 and 41'–87' tend to cam the locking bars 85 and 85' and, therefore, the neck ring mold in a rearward direction whereby the rearwardly directed end of said neck ring mold is seated firmly within the recesses 38 and 38'. The coacting conical portion 74 and conical cam surfaces 88 and 88' at the same time cam the core rod 31 forwardly as far as the shoulder 84 will allow. The parison mold, during injection, is held closed under great pressure and this causes the entire neck ring mold assembly to be pressed inwardly and rearwardly against the injection pressure of the plasticized material. It will be noted that under these conditions the flange 71 of the core rod is moved rearwardly away from the shoulder 50 since the clamping pressure of the closed parison mold easily overcomes the relatively slight pressure in the opposite direction effected by the motor 55.

After the parison has been injected upon the core rod 31, the parison mold opens with the upper parison mold half 11' moving vertically upwardly and the core rod, carried by the platform 24, moving to an intermediate position between the open parison molds. As soon as the parison mold opens, the camming pressure which forced the entire neck ring assembly in a rearward direction is released and said assembly and the core rod 31 are allowed to move forwardly under the bias of the motor 55. This movement is slight and is only that necessary to close the gap between the flange 71 and the shoulder 50 of the body portion 47. This slight forward movement of the core rod is permitted not only by the clearance between said core rod flange and said shoulder but also by the loose interfit of the converging pins 95 and 95' within the oversize apertures 97 and 97'. FIG. 4 shows generally the positions of the pins loosely within the aperture when the parison mold is closed upon the entire neck ring mold assembly and is camming it forwardly. This is the same position that the pins would take at a closed blow mold which effects the same camming of the neck ring mold assembly. FIG. 6, by comparison, shows the position taken by the pins when the pressure of closed molds is not present. In other words, the loose fit of the pins 95 and 95' allows for the slight additional rearward movement when the parison or blow molds are not completely closed, and it will be noted that this moves the rearmost edges of the neck ring mold halves 92 and 92' forwardly a slight distance away from the bottoms of the recesses 38 and 38' of the inserts 17 and 17' or the recesses 105 and 105' of the inserts 19 and 19'.

As hereinbefore described, the core rods are then shifted laterally between the open parison and blow mold halves until each newly formed parison is disposed between the halves of an open blow mold. FIG. 5 shows the position of a core rod 31 just after it has been moved downwardly by the platform 24 to dispose it within the lower blow mold half 13 and just prior to the completion of the downward movement of the upper blow mold half 13'. It will be noted in FIG. 5 that as the parison rod is lowered into the lower blow mold half, adequate clearance is provided between the rearward edge or surface of the neck ring mold half 92 and the bottom of the blow mold recess 105. In other words, the slight shifting forwardly of the core rod and the neck ring mold assembly when the parison mold opens has the effect of affording adequate and safe clearance between the neck ring mold and the bottom of the recess 105 when the core rod is lowered into the lower blow mold half and between said neck ring mold and the recess 105' when the blow mold closes upon said core rod and neck ring mold assembly. Complete closing of the blow mold will, of course, seat the neck ring mold firmly within the recesses 105 and 105' by the action of the cams 106 and 106' in the same manner as described in connection with the closed parison mold of FIG. 3. At this time, the pins 95 and 95' assume the positions illustrated in FIG. 4. Also, complete closing of the blow mold causes the adjustment screw 113 to press downwardly upon the actuator 66 thereby opening the core rod valve whereby pressurized fluid may be introduced into the parison P to blow the finished article.

FIG. 7 shows the next step in the cycle after the finished article has been blown as indicated at A. The blow mold is now open with the upper blow mold half 13' in the raised position, and the core rod 31 is disposed intermediate the open mold halves by the upwardly moved platform 24. At this point, the motor 55 is actuated in the opposite direction to move the crossbar 57 and the stripper bar 63 rearwardly. The stripper ring 65 carried by said stripper bar pushes rearwardly on the neck portion of the article A thereby breaking it loose from the core rod 31 and moving it rearwardly along said core rod. The final portion of the rearward stroke of the motor 55 brings the crossbar 57 into contact with the actuator 66 thereby opening the core rod valve by moving the valve head 78 rearwardly. Pressurized fluid is again introduced around the valve head 78 whereby the finished article A is blown rearwardly between the blow mold inserts 19 and 19' to clear the machine. FIG. 8 shows the positions of the pins 95 and 95' which have followed divergent paths guided by the apertures 97 and 97' to open the neck ring mold halves by separating the locking bars 85 and 85'. As soon as the articles have been blown clear, the motor 55 then causes the cross bar 57 and the stripper bar 63 to retract forwardly whereby the neck ring mold is again closed prior to its being transferred back to the parison mold. At the parison mold, the neck ring molds are lowered into the inserts 17 and 17' once again, and it will be noted that the clearance afforded between the neck ring mold and the recesses of the parison mold inserts would be the same at the parison mold as that illustrated in FIG. 5 at the blow mold.

In summary, the neck ring mold is held closed and shifted forwardly slightly when it is transferred from a parison mold to a blow mold or from a blow mold to a parison mold whereby when it is lowered into a lower mold half, adequate clearance is provided at the recesses of the inserts. When a blow mold opens, the rearward longitudinal movement of the stripper along the core rod automatically opens the neck ring mold to release the article being stripped and blown clear of the machine.

It will be understood that many changes in the details of this invention as herein described and illustrated may be made without, however, departing from the spirit thereof or the scope of the appended claims.

What is claimed is:

1. A mold comprising base means; separable mold half means; a carrier for moving both said mold half means toward and away from said base means; said carrier comprising a guide disposed perpendicularly to the direction of movement of said mold half means relative to said base means; ways provided in said mold half means embracing opposite edges of said guide; and a power source for moving said guide relative to said base means; one of said means carrying converging guide members projecting in the general direction of the other of said means; the other of said means having means providing complementary converging ways for receiving said guide members whereby when said mold half means are moved away from said base, said converging guide members and converging ways coact to cause said mold half means to open, and when said mold half means are moved toward said base, said guide members and ways coact to cause said mold half means to close.

2. A mold apparatus comprising a base; separable upper and lower mold half means disposed on one lateral side of said base and openable in a vertical plane; carrier means for moving both said mold half means horizontally toward and away from said base; said carrier comprising a guide bar disposed in a vertical plane, means providing grooves in both said mold half means slidably embracing upper and lower edges of said bar, and a power source for moving said bar relative to said base; said upper mold half means carrying a guide member which projects obliquely downwardly and toward said base; said lower mold half means carrying a guide member which projects obliquely upwardly and toward said base; and said base having means defining obliquely upwardly and downwardly angled ways slidably receiving the distal end portions of the guide members of said upper and lower mold half means respectively whereby when said mold half means are moved horizontally away from said base, said guide members slide in divergent directions and cause said mold half means to separate, and when said mold half means are moved horizontally toward said base, said guide members slide in convergent directions and cause said mold half means to close.

3. A neck ring mold for a blow molding machine comprising a base movable between a parison mold and a blow mold; said base carrying a core rod which projects horizontally beyond one lateral side of said base; separable upper and lower neck ring mold half means embracing said core rod adjacent to its proximal end and openable in a vertical plane; carrier means for moving both said mold half means toward and away from said base in a direction parallel with the axis of said core rod; said carrier means comprising a stripper bar affording means for stripping an article from said rod by movement outwardly along said rod and each said mold half means being grooved whereby it slidably receives an edge of said stripper bar; power means for advancing and retracting said stripper bar; said upper mold half means carrying a pin which projects obliquely downwardly and toward said base; said lower mold half means carrying a pin which projects obliquely upwardly and toward said base; and said base having means defining obliquely upwardly and downwardly angled apertures slidably receiving the distal end portions of the pins of said upper and lower mold half means respectively whereby when both said mold half means are moved horizontally away from said base, said pins slide in divergent directions and cause said mold half means to separate, and when both said mold half means are moved horizontally toward said base, said pins slide in convergent directions and cause said mold half means to close.

4. A neck ring molding apparatus for a blow molding machine comprising a base; a core rod carried by said base and projecting outwardly therefrom; an apertured stripper bar telescoped over said rod and disposed adjacent to the proximal end of said rod; said stripper bar affording means for stripping an article from said rod by movement outwardly along said rod; separable upper and lower neck ring mold half means embracing said rod and said stripper bar and being openable in a plane perpendicular to the axis of said rod; each said mold half means having a channel therein slidably receiving an edge portion of said stripper bar; said upper mold half means carrying at least one pin which projects obliquely downwardly and toward said base; said lower mold half means carrying at least one pin which projects obliquely upwardly and toward said base; said base having means defining obliquely upwardly and downwardly angled apertures slidably receiving distal end portions of the pins of said upper and lower mold half means respectively; and means for moving said stripper bar toward and away from said base along said rod whereby when said stripper bar is moved away from said base, said pins slide in divergent directions and cause said mold half means to separate, and when said stripper bar is moved toward said base, said pins slide in convergent directions and cause said mold half means to close.

5. A neck ring molding apparatus as set forth in claim 4; said apertures in said base and said pins being of such relative sizes as to effect a loose interfit therebetween whereby said neck ring mold half means are movable toward said base a slight distance after they are completely closed.

6. A neck ring molding apparatus for a blow molding machine comprising a base; a core rod carried by said base and projecting outwardly from said base; a stripper bar disposed adjacent to the proximal end of said core rod and having an aperture through which said core rod projects; said stripper bar affording means closely slidably telescoped over said core rod for stripping an article therefrom; separable neck ring mold halves embracing said core rod adjacent to said stripper bar and being openable in a plane perpendicular to the axis of said core rod; each said mold half carried by a locking bar; said locking bars having channels therein slidably receiving the upper and lower edges of said stripper bar; said upper locking bar carrying a pin which projects obliquely downwardly and toward said base; said lower locking bar carrying a pin which projects obliquely upwardly and toward said base; said base having means defining obliquely upwardly and downwardly angled apertures slidably receiving the distal end portions of the pins of said upper and lower locking bars respectively; and means for moving said stripper bar toward and away from said base along said core rod whereby when said stripper bar is moved away from said base to strip an article from said core rod, said pins slide in divergent directions and cause said locking bars and mold halves to separate, and when said stripper bar is moved toward said base, said pins slide in convergent directions and cause said locking bars and mold halves to come together.

7. A blow molding machine comprising a parison mold and a laterally disposed blow mold; each said mold comprising upper and lower separable halves; a table carrying a base; a forwardly directed core rod mounted in said base; said table shiftable laterally to alternately dispose said core rod between the halves of said parison and blow molds; a neck ring mold movable with said core rod and comprising separable halves embracing said core rod adjacent to the proximal end thereof for molding a neck portion of a hollow article; means for opening and closing said separable halves in a plane perpendicular to said rod; said parison mold halves and said blow mold halves affording recess means for receiving a forward portion of said neck ring mold when said parison and blow molds are closed on said core rod; said neck ring mold halves having means providing rearwardly converging, inclined cam surfaces and said parison and blow mold halves carrying cooperant cams adapted to abut said cam surfaces in closed position of said parison and blow molds whereby said neck ring mold in closed position is cammed forwardly into one of said recess means whenever said parison or blow mold closes upon said core rod.

8. A blow molding machine as set forth in claim 7; pusher means for moving said neck ring mold toward and away from said base in a path parallel with the axis of said core rod; said pusher means comprising a laterally directed bar; each said neck ring mold half having a groove slidably receiving an edge of said bar; means for moving said bar toward and away from said base; each said neck ring mold half carrying at least one pin projecting in the general direction of said base; said pins being so angled as to converge in the direction of said base; said base having means defining converging apertures slidably receiving distal end portions of said pins whereby when said neck ring mold halves are moved away from said base, said pins slide in divergent directions to cause said neck ring mold halves to open, and when said neck ring mold halves are moved toward said base, said pins slide in convergent directions to cause said neck ring mold halves to close.

9. A blow molding machine as set forth in claim 8; said apertures in said base and said pins being of such relative sizes as to effect a loose interfit therebetween whereby said neck ring mold is moved rearwardly a slight distance after said neck ring molds are completely closed to provide clearance between the forward end of said neck ring mold and the bottoms of said recesses when said neck ring mold is transferred to a parison or blow mold.

10. A blow molding machine having a parison mold and at least one flanking blow mold for forming hollow articles therein; each said mold having a lower fixed half and an upper, vertically openable half; a base carrying a horizontally projecting core rod; means for moving said base laterally between said parison and blow molds whereby said core rod is movable sequentially upwardly, laterally, and downwardly to transfer it out of one of said molds and into the other said mold while said molds are open; a separable neck ring mold for forming the neck of the article comprising upper and lower neck ring mold halves embracing said core rod adjacent to the proximal end thereof; each said neck ring mold half being carried by a locking bar; an apertured stripper bar telescoped over said rod and disposed between said locking bars; said locking bars having channels slidably receiving the edge portions of said stripper bar; said upper locking bar carrying pin means projecting obliquely downwardly and toward said base and said lower locking bar carrying pin means projecting obliquely upwardly and toward said base; said base having oblique apertures therein slidably receiving said pin means loosely telescoped therein; said parison mold halves and said blow mold halves having complementary recesses in the ends thereof adapted to receive an end portion of said neck ring mold in closed position; said parison mold halves and said blow mold halves each having cooperant cams carried therewith which contact said locking bars in the closed position of the molds and cam said neck ring mold into the associated said recess; reciprocable means for moving said stripper bar away from said base to strip a finished article from said rod at said blow mold in open position, the movement of said stripper bar causing said pin means to slide divergently within said apertures in said base thereby concurrently opening said neck ring mold; said stripper bar movable toward said base by said reciprocable means to close said neck ring mold; said stripper bar movable toward said base beyond the position where said neck ring mold halves close due to the loose fit of said pin means whereby clearance is provided between said neck ring mold and the bottom of said recess when said neck ring mold is lowered into the lower half of a parison or blow mold and prior to said neck ring mold being cammed into said recess by said cams.

References Cited by the Examiner
UNITED STATES PATENTS 3,008,192 11/1961 Allen et al. _____ 264—97
3,029,468 4/1962 Valyi _____ 18—5

J. SPENCER OVERHOLSER, *Primary Examiner.*

MICHAEL V. BRINDISI, *Examiner.*

W. L. McBAY, *Assistant Examiner.*